United States Patent
Xia et al.

(10) Patent No.: US 6,605,126 B1
(45) Date of Patent: Aug. 12, 2003

(54) LOW-VISCOSITY POLYMERIC COLORANTS EXHIBITING HIGH COLOR STRENGTH CHARACTERISTICS

(75) Inventors: Jusong Xia, Spartanburg, SC (US); Mark E. Ragsdale, Duncan, SC (US); Eric B. Stephens, Roebuck, SC (US)

(73) Assignee: Milliken & Co., Spartanburg, SC (US)

(*) Notice: Subject to any disclaimer, the term of this patent is extended or adjusted under 35 U.S.C. 154(b) by 43 days.

(21) Appl. No.: 09/585,763

(22) Filed: Jun. 2, 2000

(51) Int. Cl.[7] .............................................. C09B 69/10
(52) U.S. Cl. ..................... 8/647; 8/673; 8/676; 8/680
(58) Field of Search ........................... 8/647, 673, 676, 8/680; 106/22

(56) References Cited

U.S. PATENT DOCUMENTS

| | | | |
|---|---|---|---|
| 3,886,466 A | | 5/1975 | Olstowski .................. 260/32.2 |
| 4,709,002 A | | 11/1987 | Younes ......................... 528/53 |
| 4,731,427 A | | 3/1988 | Younes ......................... 528/53 |
| 4,812,523 A | | 3/1989 | Toman ........................ 525/162 |
| 5,028,635 A | | 7/1991 | Nodelman ................... 521/130 |
| 5,043,013 A | * | 8/1991 | Kluger et al. ................. 106/22 |
| 5,112,877 A | | 5/1992 | Barker et al. ................ 521/110 |
| 5,116,903 A | | 5/1992 | Gebregiorgis ............... 524/589 |
| 5,149,458 A | | 9/1992 | Nodelman ............. 252/182.26 |
| 5,176,745 A | * | 1/1993 | Moore et al. .................. 106/22 |
| 5,310,887 A | * | 5/1994 | Moore et al. ................. 534/729 |
| 5,442,034 A | | 8/1995 | Primeaux, II ................. 528/60 |
| 5,919,846 A | * | 7/1999 | Beltlaw et al. ................ 524/83 |

FOREIGN PATENT DOCUMENTS

| | | |
|---|---|---|
| EP | 0276452 A1 | 8/1988 |
| EP | 0350644 | 1/1990 |

\* cited by examiner

*Primary Examiner*—Charles Boyer
*Assistant Examiner*—Eisa Elhilo
(74) *Attorney, Agent, or Firm*—Terry T. Moyer; William S. Parks

(57) ABSTRACT

New and useful low viscosity polymeric colorant formulations are provided comprising extremely low amounts of viscosity modifiers that drastically reduce the overall viscosity of the resultant colorant formulation as compared with the viscosity of the colorants themselves. In such a manner, the resultant formulation facilitates the utilization of such polymeric colorants within certain coloring processes and methods requiring low viscosity formulations while simultaneously permitting substantial retention of the same high color strength characteristics of the unmodified colorants. Such an unexpected result thus permits production and utilization of a low viscosity formulation that does not sacrifice colorability to an appreciable degree for target substrates or media. The inventive formulations thus comprise any number of polymeric colorants, (i.e., oxyalkylenated colorants comprising at least one chromophore constituent and at least oxyalkylene chain) and at least one viscosity modifying agent possessing a dipole moment of between 1.0 and 5.0 and/or a flash point of from about −20° C. to about 180° C. Such a modifying agent provides a significant reduction in viscosity at low levels (to permit better pumpability of the desired colorants) with no appreciable differences in coloring performance within final target media, and facilitates removal of such modifiers during or after utilization. Methods of production, utilization, and products produced with such formulations and by such methods are also encompassed within this invention.

13 Claims, No Drawings

LOW-VISCOSITY POLYMERIC COLORANTS EXHIBITING HIGH COLOR STRENGTH CHARACTERISTICS

FIELD OF THE INVENTION

This invention relates generally to low viscosity polymeric colorant formulations comprising extremely low amounts of viscosity modifiers that significantly reduce the overall viscosity of the resultant colorant formulation as compared with the viscosity of the colorants themselves. In such a manner, the resultant formulation facilitates the utilization of such polymeric colorants within certain coloring processes and methods requiring low viscosity formulations while simultaneously permitting substantial retention of the same high color strength characteristics of the unmodified colorants. Such an unexpected result thus permits production and utilization of a low viscosity formulation that does not sacrifice colorability to an appreciable degree for target substrates or media. The inventive formulations thus comprise any number of polymeric colorants, (i.e., oxyalkylenated colorants comprising at least one chromophore constituent and at least oxyalkylene chain) and at least one viscosity modifying agent possessing a dipole moment of between 1.0 and 5.0 and/or a flash point of from about −20° C. to about 180° C. Such a modifying agent provides a significant reduction in viscosity at low levels (to permit better pumpability of the desired colorants) with no appreciable differences in coloring performance within final target media, and facilitates removal of such modifiers during or after utilization. Methods of production, utilization, and products produced with such formulations and by such methods are also encompassed within this invention.

BACKGROUND OF THE PRIOR ART

All U.S. Patents cited herein are entirely incorporated by reference.

Polyurethane products, such as foams, resins, and the like, have traditionally been colored by pigments, polymeric colorants, and dyes. Generally, these colorations are performed in situ during foam, resin, etc., formation. For instance, polymeric colorants (i.e., polyoxyalkylenated colorants), such as those described in U.S. Pat. No. 4,284,279 to Cross et al., have been introduced within polyol compositions during slabstock foam production. The "colored" polyol then reacts with an isocyanate composition, in the presence of a catalyst possibly, to form the desired colored foam. Pigments have also been added in the past, most notably in solid, paste, or powder form, to a polyol stream to form the same type of colored foam products. Such compounds are readily available and inexpensive; however, they also exhibit or create problems during handling, mixing (with other pigments to create different shades, for example), and actual incorporation within target media. Furthermore, pigments, being solid in nature, tend to from clumps of solids within target media that leads to aesthetically displeasing consequences or clogging of machinery or instrumentation. Additionally, spills are likely (since the powder or solid form of such pigments do not transport easily due to atmospheric conditions and possible air disturbances), and clothes or hand staining by difficult-to-handle pigment compounds is very likely to occur through the utilization of such solid coloring agents. Also, such pigments are not storage-stable in liquid form, generally, and appear to easily precipitate out of solution after even a short shelf storage duration. Furthermore, such pigments are difficult to control from a uniformity standpoint such that the ultimate polyurethane product may exhibit uneven colorations without proper and time-consuming prior mixing. As such, polymeric colorants have proven to be more desirable than powdered or solid pigments as coloring agents within such polyurethane coloring processes.

Also, thermoplastics have been colored with polymeric colorants in the past, such as in U.S. Pat. No. 4,640,690 to Baumgartner et al. Such colorants have proven quite useful and beneficial in their high coloring and low migratory and blooming properties. Pigments have also been utilized for such coloring processes; however, the use of solid and/or powders has, again, suffered from the same handling, precipitation, and uneven coloring problems, particularly in industrial operations. Polymeric colorants are thus more desirable for these procedures as well.

Also utilized to color certain thermoplastic substrates are quaternary ammonium/anionic dye complexes, such as those disclosed within U.S. Pat. Nos. 5,938,828 and 5,948,152, both to Zhao et al. Such colorants provide excellent tinting of thermoplastic compositions but also suffer from high viscosity problems in pumpability, etc., within the necessary machinery.

One drawback in the utilization of such polymeric and/or quat/anionic dye colorants, which are present as either liquids or waxes primarily, but may also exist as solid or very highly viscous pastes, is the difficulty in preparing suitable physical forms of such colorants for universal utility within desired processes. For instance, slabstock foam production requires either a high or low pressure pumping mechanism to introduce such colorants within a polyol stream. If the viscosity of the colorants is too high, such pumping may be deleteriously effected and the coloring procedure may prove too difficult to accomplish or the final product may, as with some pigments, exhibit uneven colorations. Low, and/or controlled, viscosity colorants are thus necessary to facilitate simple modifications of such beneficially coloring colorants for introduction within a variety of different coloring procedures. To date, the great majority of modifications to polymeric colorant viscosities have been accomplished through the physical admixing of large amount of viscosity modifiers, such as, for example FOMREZ®, a ? available from ? Although viscosity modifications have been provided with such agents, the overall color strength available to the end-user has been sacrificed. Thus, the desired colorants were modified for utilization within myriad processes (such as polyolefin, polyester, polyurethane, and the like, coloring methods) in the past, but greater amounts of such low viscosity colorant were required to provide the desired coloring strength (and thus coloring effects) within the target substrates and/or media. (For this invention, the term "color strength" is intended to encompass the degree of color available for introduction within a target composition per actual volume of colorant present, otherwise known as color value. Such a color value is thus directly related to the actual amount of colorant present within the colorant composition.) The greater amount of low viscosity colorant required, the greater the cost to the end-user, and ultimately, to the consumer. There is thus a need to provide a reduced viscosity polymeric colorant composition which does not lose any appreciable degree of color strength upon attaining the desired viscosity level. To date, no such improvement has been accorded this industry by the prior art.

OBJECTS OF THE INVENTION

It is therefore an object of this invention to provide a high color strength, low viscosity, polymeric colorant-comprising composition that also comprises extremely low amounts of viscosity reducing agents. A further object is to provide a polymeric colorant composition that exhibits a significant reduction in viscosity with an extremely low amount of viscosity reducing agent, which does not deleteriously effect the desired coloring procedure, present. A further objective of this invention is to provide a extremely low viscosity polymeric colorant composition that retains substantially the same general color value as a high viscosity composition comprising the same polymeric colorant, wherein the colorant is present in the low viscosity composition in an amount nearly the same as that of the high viscosity colorant.

SUMMARY OF THE INVENTION

Accordingly, this invention is directed to a nonaqueous liquid composition comprising at least one polymeric colorant containing composition and at least one viscosity modifying compound exhibiting a dipole moment of between about 1.0 and 5.0 or, alternatively, exhibiting a flash point of between about −20° C. and 180° C. Preferably, though not necessarily, the viscosity modifying compound is aprotic in nature; although glycols do seem to function properly to significantly reduce the viscosity of the target polymeric colorant composition, their presence within certain target media (such as polyurethanes) is undesirable due to the presence of reactive hydroxyls on such compounds. The methods of production of such compositions are also contemplated within this invention. The term "liquid composition" is intended to encompass any composition which is present in a fluid state (i.e., possessing a viscosity of below about 10,000 centipoise at standard temperature and pressure).

The term "nonaqueous" denotes a composition into which no water has been specfically introduced. Due to the possibility of atmospheric water being introduced through exposure to a relatively humid environment, this term does not rule out the potential for any water to be present through such a manner. The term "liquid dispersion" is intended to encompass any composition which is present in a fluid state (i.e., possessing a viscosity of below about 10,000 centipoise at standard temperature and pressure). The term "aprotic" is well known within the chemical arts and simply means that no protons can be accepted or donated by the specific compound. As such, it is imperative that certain moieties not be present on the intended viscosity modifying compound. Such unwanted moieties include, without limitation, acid groups, hydroxyls, amines, and the like. However, as noted above, this list is not definitive; any aprotic compound possessing the required dipole moment property is included in this definition.

The dipole moment requirement for the viscosity modifying compound is necessary to provide the desired performance characteristics for the inventive nonaqueous low viscosity liquid polymeric colorant containing compositions. It has been found, surprisingly, that the selection of a relatively low dipole moment viscosity modifying compound provides the desired drastic lowering of overall viscosity with minimal amounts of viscosity modifying material, thus providing the desired high color retention. Furthermore, due to the low dipole moment, the corresponding flash point of the viscosity modifying compound is also relatively low in order to permit removal of such a compound upon introduction within a coloring method utilizing relatively low processing temperatures. As such, since the aprotic compound must exhibit a low flash point, and dipole moments have not been recorded for all compounds which may function in this capacity within the inventive dispersions, the viscosity modifying compound may alternatively be defined in relation to its aprotic nature and its flash point. Thus, a flash point of between about −20° C. and 180° C. is necessary; preferably such a level is between 0° C. and 165° C.; more preferably from 80° C. to about 160° C.; most preferably between about 95° C. and 145° C. Such an aprotic compound thus does not affect any production methods (such as, as merely one example, polyurethane coloring through initial introduction within a polyol composiiton followed by admixing with an isocyanate; at low heat exposures, the viscosity modifying compound will evaporate from the final composition with relative ease). It is also preferable that the selected aprotic viscosity modifying compound (or compounds) be liquid in nature and exhibit a viscosity of at most 500 centipoise at standard temperature and pressure (i.e., 25° C. at 1 atmosphere) as measured by a Brookfield Viscometer. This requirement facilitates handling (particularly in large-scale industrial applications) and more easily permits production of the desired viscosity level for the nonaqueous liquid composition itself.

Also determined to be of great importance to the selection of a proper viscosity modifying compound within the inventive nonaqueous liquid pigment dispersion is the molecular weight of such a compound. Due to the low dipole moment (which concerns the low polarity of the compound itself), and/or the low flash point necessary for such a compound, the molecular weight must also be rather low. Thus, a molecular weight of at most 200 is available for the inventive dispersion; preferably, this weight is at most 150; more preferably, at most about 120; and most preferably, between about 85 and 116.

Such specific compositions provide low-viscosity compositions comprising highly desirable high color value polymeric colorants. In the past, as noted above, the necessity of reducing the viscosity of polymeric colorant-containing compositions in order to permit utilization within certain processes resulted in a severe reduction in the amount of colorant actually present within the low viscosity formulation. As a result, the available color value for such a low viscosity composition was sacrificed in order to provide a more versatile colorant composition. This loss of color value detrimentally affects the costs involved in the production of such target substrates or media since greater amounts of low viscosity colorant composition had to be introduced in order to effectuate an acceptable color shade. The inventive compositions alleviate such a problem by providing a low viscosity formulation of large amounts of intrinsically high viscosity polymeric colorants (which thus exhibit high color strength characteristics). Thus, lower amounts of low viscosity colorant compositions may thus be utilized to provide acceptable color levels to target substrates or media in comparison with the aforementioned previously utilized low viscosity formulations. Such an improvement is quite significant as the versatility and costs involved with such polymeric and/or quat/anionic dye colorants are increased and decreased, respectively. Thus, the inventive compositions of such colorants and low dipole moment compounds provide significant reductions in viscosity (such as a viscosity reduction of about 50% as compared with the non-modified colorant with a small amount of low dipole moment modifier present, such as about 1 to about 5% by weight).

The term "polymeric colorants" is intended to encompass any colorant which possesses, as constituent moities, chains of at least two alkyleneoxy groups. Such a term is widely known and used within the colorant industry and thus would be easily understood and appreciated by the pertinent ordinarily skilled artisan. Preferably, such colorants meet any structure defined by Formula (I)

$$R\{A[(B)_n R^1]_m\}_x \qquad (I)$$

wherein
  R is an organic chromophore;
  A is a linking moiety in said chromophore selected from the group consisting essentially of N, O, S, SO$_2$N, and CO$_2$;

B is selected from the group of one or more alkyleneoxy constituents containing from 2 to 4 carbon atoms;

n is an integer of from 2 to about 100;

m is 1 when A is O, S, or $CO_2$, and m is 2 when A is N or $SO_2N$;

x is an integer of from 1 to about 5, preferably 1 or 2; and $R^1$ is selected from the group consisting of H, $C_1$–$C_4$ alkyl, $C_{10}$–$C_{22}$ fatty ester, a $C_1$–$C_{20}$ alkenyl succinic anhydride moiety, and any mixtures thereof. The organic chromophore may be of any standard type, including, without limitation, anthraquinone, methine, azo, disazo, trisazo, diazo, nitroso, triphenylmethane, diphenylmethane, xanthane, acridine, indamine, thiazole, or oxazine. Preferably, R is one or more of triphenylmethane, methine, azo, or thiazole based compounds. Group A is present on group R and is utilized to attach the polyoxyalkylene constituent to the organic chromophore. Nitrogen is the preferred linking moiety. The polyoxyalkylene group is generally a combination of ethylene oxide and propylene oxide monomers. Preferably propylene oxide is present in the major amount. The preferred number of moles of polyoxyalkylene constituent per chain (B) is from 2 to 15 (n would therefore preferably be from 4 to 30), more preferably from 4 to 10 (n would most preferably be from 8 to 20). Also, preferably two such polyoxyalkylene chains are present on each polymeric colorant compound (x, above, is preferably 2). Group $R^1$ is preferably hydrogen; however, $C_{16}$–$C_{18}$ fatty esters are also highly preferred.

As noted above, also useful as colorants within this inventive composition are purified quat/anionic dye types as disclosed within U.S. Pat. Nos. 5,938,828 and 5,948,152, either alone or incombination with the polymeric colorants noted above.

The colorants utilized within the present invention are generally liquid at ambient conditions of temperature and pressure, although they are generally highly viscous liquids (i.e., greater than about 6,000 cps, more likely higher than about 9,000 cps. As discussed above, in order to permit or improve pumpability of these colorants within and/or into certain coloring processes, the viscosities thus must be reduced significantly. Most mechanisms required to incorporate such polymeric colorants within target media (for example, mixheads and/or feed tank pipes for adding pigments within polyurethane foam production methods) utilize certain pumps and feed lines that are highly sensitive to pressure provided by higher viscosity compositions. With lower and possibly more uniform viscosities between utilized colorant compositions, versatility of colors increases, thereby providing an overall improved ability to produce desirable end products. Such low viscosity may be (and has been) provided through the introduction of a solvent or viscosity modifier at a point in time near to the actual incorporation of the dispersion within the target media (for polyurethane, the addition would take place either within the polyol component or within the isocyanate component; the two components are mixed together with catalysts to form the desired polyurethane foam). However, this late introduction adds to the complexity and potential problems facing the user in producing such dispersions, again, and particularly, at the industrial level. Thus, a storage stable, low viscosity polymeric colorant containing composition is highly desired; unfortunately, such compositions have not been available until this recent development.

The inventive nonaqueous liquid compositions exhibit a number of surprising characteristics that lend themselves to a suitable inexpensive, yet highly effective, coloring formulation, particularly for polyurethane foams. Storage stability, without any phase separation between liquid components, is of utmost importance with such compositions. The retention of extremely low viscosities, without any noticeable or, at least significant, increase, over a long duration, thus provides a highly desired, easy-to-handle product. Without intending to be bound to any scientific theory, it is believed that such storage stability is provided through the interaction of the specifically selected aprotic viscosity modifiers with the target liquid colorants by preventing reactions or attraction between reactive groups (hydroxyls, for example) on the colorants themselves and, since the viscosity modifying compounds are aprotic, not reacting with the colorants. Additionally, the polyurethane foams produced with such inventive dispersions do not exhibit any appreciable losses in color or shade depth in comparison with standard non-modified pigment dispersions nor extraction of the modifying agents after prolonged use or exposure to harsh conditions (i.e., methanol, salt water, etc.). Other impressive similarities between such viscosity modified and non-viscosity modified pigment dispersions are discussed in greater detail below. Succinctly, the inventive dispersions provide improved processability over non-modified polymeric colorant compositions, as well as simultaneous storage stability, all without any appreciable loss in performance as compared with the same non-modified polymeric colorant compositions. Such highly unexpected benefits are of enormous importance to improving upon the available process conditions for applications requiring polymeric colorant utilization.

Particularly preferred colorants, and thus merely examples of the polyoxyalkylene polymeric colorant and/or quat/anionic dye colorant of this invention, include the following:

TABLE 1

Preferred Poly(oxyalkylenated) Colorants

| Ex. # | Color | Chromophore | Moles EO | Moles PO | Group A | Group $R_1$ |
|---|---|---|---|---|---|---|
| 1 | Blue | Triphenylmethane | 4 | 26 | N | H |
| 2 | Blue | Triphenylmethane | 4 | 16 | N | H |
| 3 | Blue | Triphenylmethane | 12 | 8 | N | H |
| 4 | Red | Benzothiazole | 6 | 6 | N | H |
| 5 | Yellow | m-toluidine Methine | 6 | 6 | N | H |
| 6 | Yellow | Aniline Methine | 7 | 15 | N | H |
| 7 | Yellow | m-toluidine Methine | 16 | 10 | N | H |
| 8 | Yellow | m-toluidine Methine | 10 | 14 | N | H |
| 9 | Orange | diphenyl bisazo | 16 | 20 | N | H |
| 10 | Purple | Dinitroaniline azo | 8 | 10 | N | H |
| 11 | Violet | Thiophene Azo | 10 | 14 | N | H |
| 12 | Yellow | Aniline Methine | 7 | 15 | N | H |
| 13 | Red | Benzothiazole Azo | 16 | 20 | N | H |

EXAMPLES 14 AND 15

Preferred Purified Quat/Anionic Dye Colorants

Example 14

Four hundred fourteen grams of direct blue 86 (0.342 mol), six hundred twenty-two grams of methyl bis [polyethoxy (15) ethanol] coco ammonium chloride (0.683 mol, trade name Variquat® K1215) were dissolved in one liter of water. The solution was stirred for 2 hours. The complex was purified through ultrafiltration. The ultrafiltration process was monitored by monitoring the sodium level of the solution. When the sodium level (adjusted to 100% solid) is lower than 1000 ppm by weight, the solution was stripped under reduced pressure at 90° C. to produce homogenous dark blue liquid. Upon cooling to 25° C. at 1 atmosphere of pressure, the resultant complex remained in liquid state.

A small amount of the resultant blue liquid was then placed between two microscope slides to test for uniformity of color. The liquid was evenly spread out upon placement of the upper slide and the slides were then viewed under a microscope at 10× power. This sample was homogenous and even amounts of color were uniformly distributed throughout the viewed slides. No phase separation or foreign substances (particles, for instance) were observed.

Example 15

One hundred twenty six grams of direct blue 86, two hundred twenty grams of methyl (polypropylene glycol) diethyl ammonium chloride (trade name Emcol™ CC-9) were dissolved in one liter of water. The mixture was stirred for 2 hours. The solution was then extracted with 500 milliliters of methylene chloride. The methylene chloride solution was stripped under reduced pressure. An anhydrous flowable dark blue liquid was produced which remained in a liquid state at room temperature and pressure.

The dipole moment requirement for the viscosity modifying compound is necessary to provide the desired performance characteristics for the inventive nonaqueous pigment-containing dispersion. It has been found, surprisingly, that the selection of a relatively low dipole moment viscosity modifying compound provides the desired drastic lowering of overall viscosity while simultaneously separating individual pigment particles within solution, and preventing reagglomeration of the same particles. Furthermore, due to the low dipole moment, the corresponding flash point of the viscosity modifying compound is also relatively low in order to permit removal of such a compound upon introduction within a coloring method utilizing relatively low processing temperatures. As such, since the viscosity reducing (preferably aprotic) compound must exhibit a low flash point, and dipole moments have not been recorded for all compounds which may funciton in this capacity within the inventive dispersions, the viscosity modifying compound may alternatively be defined in relation to its aprotic nature and its flash point. Thus, a flash point of between about −20° C. and 180° C. is necessary; preferably such a level is between 0° C. and 165° C.; more preferably from 80° C. to about 160° C.; most preferably between about 95° C. and 145° C. Such a preferred aprotic compound thus does not affect any production methods (such as, as merely one example, polyurethane coloring through initial introduction within a polyol composition followed by admixing with an isocyanate; at low heat exposures, the viscosity modifying compound will evaporate from the final composition with relative ease). It is also preferable that the selected aprotic viscosity modifying compound (or compounds) be liquid in nature and exhibit a viscosity of at most 500 centipoise at standard temperature and pressure (i.e., 25° C. at 1 atmosphere) as measured by a Brookfield Viscometer. This requirement facilitates handling (particularly in large-scale industrial applications) and more easily permits production of the desired viscosity level for the nonaqueous liquid pigment dispersion itself.

Also determined to be of great importance to the selection of a proper viscosity modifying compound within the inventive nonaqueous liquid pigment dispersion is the molecular weight of such a compound. Due to the low dipole moment (which concerns the low polarity of the compound itself, and/or the low flash point necessary for such a compound, the molecular weight must also be rather low. Thus, a molecular weight of at most 200 is available for the inventive dispersion; preferably, this weight is at most 150; more preferably, at most about 120; and most preferably, between about 85 and 116.

Such an inventive dispersion is preferably storage stable. By this term, it is intended that the inventive dispersion will remain in a fluid state with substantially no phase separation of or gelation between liquid components for at least 60 days while being continuously exposed to a temperature of at least 50° C. Such a test is one manner of reproducing long-term storage conditions and thus is not intended as being the sole limitation of temperature within this invention. One of ordinary skill in this art would appreciate the need to provide a modified test of this nature. Thus, the inventive dispersions must merely exhibit substantially no phase separation and retention of its low viscosity after exposure to high temperature storage for 60 days. Certain standard compounds found within polymeric colorant compositions do not provide the desired low viscosity results noted above. Specific viscosity modifiers that do not provide such significant modifications include, without limitation, DMSO, polyethylene glycol (of most any molecular weight), FOMREZ® series compounds (from Witco), and the like. This list is not meant to be exhaustive, only exemplary as to what compounds may be present within the "polymeric colorant containing composition" prior to viscosity modification with the desired viscosity modifying compounds agents.

The specific and thus preferred viscosity reducing agents for this invention include cyclic carbonates and cyclic lactones, monoalkylene glycols, or any mixtures thereof, more preferably, propylene carbonate, ethylene carbonate, butyrolactone, butylene carbonate, caprolactone, valerolactone, propylene glycol, ethylene glycol, and the like. Most preferably, such agents are either butyrolactone or propylene carbonate (or mixtures of both). The monoalkylene glycols may be utilized as preferred viscosity reducing agents for thermoplastic coloring procedures; however, these compounds tend to react with free isocyanates too easily in polyurethane coloring processes so they should be avoided in those particular instances. Such compounds may be added in any proportion to the polymeric colorant containing composition in order to provide the desired viscosity reduction; however, the lower the amount, the greater color strength is provided by the resultant low viscosity polymeric colorant composition. Thus, amounts as low as 0.01 and as high as about 20% by weight of the entire composition are workable. Preferably, these proportions are from about 1 to about 15%, more preferably, from about 3 to about 15%, and most preferably from about 5 to about 10%, again all by weight.

The use of cyclic carbonates and cyclic lactones in polyurethane chemistry is known. U.S. Pat. No. 3,883,466 describes the use of a cyclic alkylene carbonate as a liquid modifier to moderate the reaction exotherm between the hydroxy component and the polyisocyanate in the production of a rigid, dense rapid-setting polyurethane. U.S. Pat. Nos. 4,709,002 and 4,731,427 describe the use of cyclic alkylene carbonates in the production of rigid RIM polyisocyanurate and urethane-modified polyisocyanurate parts. These two references do not indicate why cyclic alkylene carbonate is used but do suggest that the carbonate can be added to the isocyanate stream in order to reduce its viscosity. U.S. Pat. Nos. 5,028,635 and 5,149,458 report two polyurea-cyclic carbonate RIM systems having improved flow properties. European Patent 0,350,644 and U.S. Pat. No. 5,442,034 report similar applications for cyclic carbonate in RIM elastomers and spray polyurea elastomers, respectively. U.S. Pat. No. 4,812,523 describes high solids thermosetting coating composition with cyclic carbonates as reactive diluents to reduce viscosity. Cyclic carbonates and cyclic lactones have also been used as viscosity reducing agents in aromatic polyester polyols and polyether polyols (EP 0,276,452). No teachings or fair suggestions exist, however, that cover the incorporation, addition, etc., of such viscosity reducing agents to already liquid polymeric colorants to improve the desired coloring procedures.

As it concerns this invention, it was first determined, initially and surprisingly, that viscosity modifications that are more drastic than traditional modifications for polymeric colorants actually provide improved color strength characteristics to polymeric colorant containing compositions and thus the versatility of such compositions can consequently be increased. It was then discovered that specific viscosity reducing agents which provide drastic viscosity reductions were not only available, but also workable and beneficial for the target processes, to-be-colored substrates, and to-be-colored media. There is no mention or suggestion of the addition of such particular viscosity reducing agents to and/or within polymeric colorants or polymeric containing compositions anywhere within the pertinent prior art.

The inventive compositions are thus liquid in nature and do not exhibit any gelation, even after long-term storage (i.e., two months at elevated temperatures). Thus, such compositions do not exhibit any thixotropic characteristics and do not require mixing, shaking, or the like, prior to incorporation within the desired coloring procedure. Such coloring procedures generally require the injection or addition of the low viscosity polymeric colorant within a liquid formulation, such as a polyol stream (for a polyurethane coloring procedure) or a molten polymer (for a thermoplastic coloring procedure). Interestingly, and preferably for this invention, the preferred viscosity reducing agents noted above all exhibit rather low vapor pressures as any excess present within the target liquid is easily evaporated upon exposure to heat. Furthermore, these preferred viscosity reducing agents do not exhibit deleterious reactions with the target constituents (except for monoalkylene glycols which react unfavorably with the isocyanates of polyurethane procedures). Thus, the benefits provided by the selected viscosity reducing agents are quite significant and result in reduced colorant and consequently, reduced costs for the consumer.

Although the inventive compositions may comprise a formulation of solely polymeric colorant and preferred viscosity reducing agent, other constituents may also be present. Such components include, without limitation, solvents, such as water, lower alcohols, methyl ethyl ketone, and the like; other types of colorants, including dyes, pigments, inks, and the like; hydrotropes; salts; pH modifiers; other viscosity modifying agents; and surfactants.

DESCRIPTION OF THE PREFERRED EMBODIMENT

For the following examples, the particularly analyzed, and thus the potentially preferred aprotic viscosity modifying compounds (and some comparative compounds) were:

TABLE 2

Viscosity Modifiers Tested

| Modifier | Dipole Moment | Flash Point (° C.) | Mol. Weight |
|---|---|---|---|
| Propylene Carbonate (PC) | 4.9 | 135 | 102 |
| Butylene Carbonate (BC) | * | 135 | 116 |
| Ethylene Carbonate (EC) | 4.87 | 160 | 88 |
| Butyrolactone (BLO) | 4.27 | 98 | 86 |
| Caprolactone (CLO) | 4.35 | 109 | 114 |
| 1,3-Dioxolane (DOL) | 1.19 | 1 | 74 |
| Tetrahydrofuran (THF) | 1.75 | −17 | 72 |
| Dimethylsulfoxide (DMSO) | 3.96 | 95 | 78 |
| Ethylene Glycol (EG) | 2.28 | 110 | 62 |
| Propylene Glycol (PG) | * | 107 | 76 |

*The Dipole Moments of these compounds have not been determined.

Thus, these compounds were introduced within the following non-limiting, but preferred and comparative examples, and analyzed and tested for various desired characteristics. Unless otherwise noted, the viscosity was measured at 25° C. at standard pressure, and at a spindle rate of 6 rpm in a Brookfied 1 Viscometer.

TABLE 3

Viscosity Behavior (cps) of Example 1 from Table 1 Above for 0, 1, 2, 3, 5, 10, and 15% by weight additions of specific additives as noted (Color Value of about 49)

| Additive | Standard | 1% | 2% | 3% | 5% | 10% | 15% | Speed |
|---|---|---|---|---|---|---|---|---|
| Fomrez ® | 51,200 | 47,500 | 44,600 | 41,000 | 35,500 | 23,000 | 16,200 | 0.5 rpm |
| CLO | 51,200 | 48,830 | 38,500 | 34,160 | — | — | — | 0.5 rpm |
| DEG | 51,200 | 40,500 | 35,500 | 31,500 | 19,300 | 9,700 | 5,700 | 0.5 rpm |
| PC | 51,200 | 39,600 | 32,100 | 27,500 | 20,600 | 8,600 | 4,433 | 0.5 rpm |
| BLO | 51,200 | 41,850 | 32,200 | 25,500 | — | — | — | 0.5 rpm |
| EG | 51,200 | 36,600 | 29,600 | 23,800 | 15,600 | 7,200 | 4,100 | 0.5 rpm |

Such a colorant was adjusted in color value to 40 and 35, respectively, through the addition of large amounts (about 20 and 25% by weight, respectively) of FOMREZ®. To such colorant compositions, the following additives were introduced with the following viscosity effects as listed in Tables 4 and 5:

TABLE 4

Viscosity Behavior (cps) of Example 1 (CV 40) for 0, 1, 2, and 3% by weight additions of viscosity modifying compounds

| Additive | Standard | 1% | 2% | 3% |
|---|---|---|---|---|
| BC | 12,160 | 8,040 | 6,940 | 5,700 |
| EC | 12,160 | 7,625 | 7,080 | 5,841 |
| PC | 12,160 | 7,333 | 6,500 | 6,000 |

TABLE 5

Viscosity Behavior (cps) of Example 1 (CV 35) for 0, 1, 2, and 3% by weight additions of viscosity modifying compounds

| Additive | Standard | 1% | 2% | 3% |
|---|---|---|---|---|
| BC | 5,300 | 4,700 | 4,283 | 3,714 |
| EC | 5,300 | 3,671 | 2,676 | 2,613 |
| PC | 5,300 | 4,500 | 3,400 | 2,800 |

TABLE 6

Viscosity Behavior (cps) of Example 2 from TABLE 1 (CV 71) for 0, 1, 2, 3, 5, 10, and 15% by weight additions of viscosity modifying compounds

| Additive | Standard | 1% | 2% | 3% | 5% | 10% | 15% |
|---|---|---|---|---|---|---|---|
| PEG 400 | 87,900 | 62,100 | 58,200 | 50,900 | 34,500 | 18,700 | 12,800 |
| Fomrez ® | 87,900 | 62,800 | 57,000 | 55,800 | 43,800 | 28,700 | 20,500 |
| DMSO | 87,900 | 62,300 | 45,700 | 38,300 | 29,400 | 10,300 | 3,800 |
| DEG | 87,900 | 61,300 | 49,200 | 41,900 | 27,700 | 13,200 | 7,100 |
| EG | 87,900 | 60,900 | 43,600 | 33,100 | 20,600 | 9,000 | 4,700 |
| PC | 87,900 | 72,100 | 63,400 | 39,100 | 26,400 | 12,200 | 5,800 |

EXAMPLE 3

Colorant From Table 1

This colorant exhibited a much higher viscosity than that of Examples 1 and 2. Its viscosity was too high to be read by Brookfield Viscometer (Model DV-II+). As a result, this colorant had to be initially mixed with 3% FOMREZ® before adding other viscosity modifiers.

Various potential modifiers were screened for this colorant (cut with 3% FOMREZ®) and the viscosity behaviors are listed in TABLE 7, below. The results suggest that EG and PC can effectively reduce viscosity for this specific colorant.

TABLE 7

Viscosity Behavior (cps) of Example 3 (CV 77) for 0, 1, 2, 3, 5, 10, and 15% by weight additions of viscosity modifying compounds

| Additive | Standard* | 1% | 2% | 3% | 5% | 10% | 15% |
|---|---|---|---|---|---|---|---|
| Fomrez[1] | 131,100 | 129,000 | 126,100 | 109,360 | 98,330 | 49,600 | 33,160 |
| PC | 131,100 | 116,500 | 98,880 | 91,000 | 79,500 | 20,500 | 10,500 |
| EG | 131,100 | 87,160 | 65,330 | 57,360 | 31,500 | 12,300 | 5,833 |

*As noted above, no readings could be made with the standard sample.
[1]This was used as the standard sample.

EXAMPLE 4
Colorant From Table 1

This colorant also exhibited a very high viscosity. The results in TABLE 8 suggest that DEG and PC can effectively reduce this colorant's viscosity while retaining a high color value.

TABLE 8

Viscosity Behavior (cps) of Example 14 (CV 79) for 0, 1, 2, 3, 5, 10, and 15% by weight additions of viscosity modifying compounds

| Additive | Standard | 1% | 2% | 3% | 5% | 10% | 15% |
|---|---|---|---|---|---|---|---|
| Fomrez | 135,000 | 129,800 | 118,000 | 105,200 | 90,660 | 58,830 | 34,000 |
| DEG | 135,000 | 104,800 | 92,330 | 69,000 | 38,830 | 13,500 | 7,833 |
| PC | 135,000 | 118,200 | 85,660 | 80,500 | 44,160 | 16,500 | 7,833 |

TABLE 9

Viscosity Behavior (cps) of Example 4 (CV 53) for 0, 1, 2, 3, 5, 10, and 15% by weight additions of viscosity modifying compounds

| Additive | Standard | 1% | 2% | 3% | 5% | 10% | 15% |
|---|---|---|---|---|---|---|---|
| PC | 10,420 | 9,080 | 7,880 | 6,900 | 4,725 | 2,720 | 1,500 |

TABLE 10

Viscosity Behavior (cps) of Example 6 Uncut (CV 44) for 0, 1, 2, 3, 5, 10, and 15% by weight additions of modifying compounds

| Additive | Standard | 1% | 2% | 3% | 5% | 10% | 15% |
|---|---|---|---|---|---|---|---|
| Fomrez | 4,375 | 4,212 | 3,980 | 3,950 | 3,675 | 3,262 | 2,637 |
| DEG | 4,375 | 3,987 | 3,525 | 3,300 | 2,712 | 2,300 | 1,700 |
| EG | 4,375 | 3,787 | 3,412 | 3,175 | 2,537 | 1,710 | 1,162 |
| PC | 4,375 | 3,812 | 3,450 | 3,062 | 2,437 | 1,412 | 850 |

TABLE 11

The Viscosity Effect (cps) of PC to Uncut Example 6, 7, and 8

| Example | Standard | 1% PC | 2% PC | 3% PC |
|---|---|---|---|---|
| 6 | 1,125 | 1,040 | 977 | 900 |
| 7 | 937 | 885 | 830 | 767 |
| 8 | 940 | 878 | 825 | 763 |

TABLE 12

The Viscosity Effect (cps) of PC to Uncut Example 9, 10, and 11

| Example | Standard | 1% PC | 2% PC | 3% PC |
|---|---|---|---|---|
| 9 | 8,862 | 8,200 | 7,587 | 5,750 |
| 10 | 3,460 | 3,324 | 3,185 | 2,820 |
| 11 | 2,335 | 2,090 | 1,945 | 1,820 |

TABLE 13

Viscosity Behavior of Examples 12, 13 and 1

| Example | Standard | 1% PC | 2% PC | 3% PC |
|---|---|---|---|---|
| 12 | 344 | 321 | 292 | 284 |
| 13 | 431 | 401 | 366 | 352 |
| 1 | 2,150 | 2,020 | 1,850 | 1,733 |

Thus, such compounds provide excellent viscosity reduction characteristics.

Ethylene Glycol (EG) as a Viscosity Reducing Agent for Foam Colorations

As shown below, ethylene glycol demonstrated a good ability for reducing viscosity. For such polymeric colorants. In order to see if it is suitable in PU application, a sample of Example 1, above, and the same colorant mixed with 3% EG were tested in regular ether foam, ester foam and clicable foam. The related performances are summarized as the following concerning the time necessary to effectuate rise in the foam bun, the amount of time required to show adhesion to a metal spatula placed on the foam bun after production, and the amount of shrinkage noticed subsequent to foam bun production:

Ether Foam:

| Sample | CV | PHP (CV) | Rise Time | Tack Time |
|---|---|---|---|---|
| Example 1 | 24.7 | 2 | 1 min. 33 sec | 3 min |
| Example 1/3% EG | 35 | 2 (24.7) | 1 min. 22 sec | 3 min |

Ester Foam:

| Sample | CV | PHP (CV) | Foam Performance (Rise Tack) |
|---|---|---|---|
| Example 1 | CV 24.7 | 10 PHP | Good Foam |
| Example 1/3% EG | CV 35 | 10 PHP (35) | Failed |
| Blue X3LV/3% EG | CV 35 | 10 PHP (24.7) | Failed |

| Sample | CV | PHP (CV) | Foam Shrinkage (Acceptable?) |
|---|---|---|---|
| Example 1 | 24.7 | 10 PHP | OK |
| Example 1/3% EG | 35 | 10 PHP (35) | OK |
| Example 1/3% EG | 35 | 10 PHP (24.7) | OK |

Although it passed the performance tests for polyether foam and clicable foam, the Example 1 colorant/3%EG (CV 35) blend failed to make regular 10 PHP polyester foam.

Propylene Carbonate (PC) as a Viscosity Reducing Agent for Foam Colorations

As demonstrated in Section 5.1 to 5.6, cyclic carbonates (BC, EC, PC), cyclic lactones (CLO and BLO), diethylene glycol (DEG) and ethylene glycol (EG) can effectively reduce the viscosity of polymeric colorants. But the addition of DEG or EG into the colorants will potentially consume isocyanate (TDI or MDI), one of the starting materials of polyurethane polymerization. It will affect product polyurethane foam performance and require changing the related formulation.

Cyclic carbonates and cyclic lactones do not generate extra hydroxyl (OH) group during the polymerization, as shown in Scheme 1. From this point of view, they are suitable as viscosity modifiers in polyurethane application (Some carbon dioxide may also be generated from cyclic carbonate side reactions, but no advisable effect was observed).

High Strength Low Viscosity Blue (Example 1)—
Technical Feasibility

By cutting Example 1 to CV 35 with 3% PC and 3% Fomrez®, a new high strength blue colorant was made.

High Strength Blue (CV 35) vs. Blue X3LV (CV 24.7):

| Compositions | HS Blue | X3LV |
| --- | --- | --- |
| Example 1 Uncut (CV 53) | 66% | 46.6% |
| Fomrez ® | 31% | 53.4% |
| PC | 3% | — |
| Viscosity (cps) | 2,833 | 2,275 |

Basically, it was found that about 0.7 g of this new blue colorant (Color Value of about 35) was equal in strength to about 1 g of Example 1 (CV of about 25), thus reducing the amount of colorant needed to provide effective colorations within target media.

Several lab tests related to polyether and polyester foams, color extraction, and temperature/long storage were performed. Results suggest that the performance of PC blended new blue colorant (comprising Example 1) was very similar in performance to the unmodified colorant of Example.

a) Polyether Foams (2 PHP and 4 PHP)

The foam rise time (the amount of time needed to effectuate a the rise of foam; the quicker the rise time, the more efficient the process), tack time (the less time the better as retained adhesion after foam production and curing is undesirable and costly), bun height (the foamier the article the better) and firmness (the more resilient the foam article the more useful it is), were all tested for the new blue colorant in relation to its Example 1 counterpart. For each test, the two colorants provided substantially the same results, thus showing the viability of the low viscosity blue in polyether foams.

b) Polyester Foams (2 PHP and 4 PHP)

The foam rise time, tack time, bun height and firmness were substantially the same for both colorants, again showing the viability of the low viscosity colorant.

c) Extraction Tests (4 PHP Polyurethane Foam) in Methanol Upon 60 Days Storage

The results listed in the following table show the low extraction of the new low viscosity colorant from foam media.

| Sample | Extraction | Foam Sample | Extraction |
| --- | --- | --- | --- |
| Example 1/3% PC | 0.0491 | Example 1 | 0.0493 | d) Effect of Elevated Temperature and Long Storage Time

A sample of the Example ⅓% PC in a tightly capped container was placed in a 50° C. oven, and the viscosity of the sample was measured every day for 10 days. No viscosity change was detected and no phase separation was observed.

While the invention will be described and disclosed in connection with certain preferred embodiments and practices, it is in no way intended to limit the invention to those specific embodiments, rather it is intended to cover equivalent structures and all alternative embodiments and modifications as may be defined by the scope of the appended claims and equivalence thereto.

What is claimed is:

1. A nonaqueous liquid composition comprising at least one polymeric colorant containing composition and at least one viscosity reducing compound, wherein said viscosity reducing compound exhibits a dipole moment of between 1.0 and 5.0; wherein said at least one polymeric colorant is selected from the group consisting of any of the colorants defined within Formula (I)

$$R\{A[(B)_n R^1]_m\}_x \quad (I)$$

wherein

R is an organic chromophore;

A is a linking moiety in said chromophore selected from the group consisting of N, O, S, $SO_2N$, and $CO_2$;

B is selected from the group of one or more alkyleneoxy constituents containing from 2 to 4 carbon atoms;

n is an integer of from 2 to about 100;

m is 1 when A is O, S, or $CO_2$, and m is 2 when A is N or $SO_2N$;

x is an integer of from 1 to about 5; and $R^1$ is selected from the group consisting of H, $C_1$–$C_4$ alkyl, $C_1$–$C_8$ fatty ester, a $C_1$–$C_{20}$ alkenyl succinic anhydride moiety, and any mixtures thereof; and wherein said nonaqueous liquid composition exhibits a viscosity lower than the viscosity of said at least one polymeric colorant containing composition.

2. The liquid composition of claim 1 wherein said at least one viscosity reducing compound is aprotic in nature.

3. The liquid composition of claim 1 wherein said at least one viscosity reducing compound is selected from the group consisting of at least one cyclic carbonate, at least one lactone, at least one glycol, and any mixtures thereof.

4. The liquid composition of claim 1 wherein said viscosity reducing agent is selected from the group consisting of at least one cyclic carbonate.

5. The liquid composition of claim 1 wherein said viscosity reducing agent is present in an amount between about 0.5 and 5% by weight of the entire composition.

6. The liquid composition of claim 4 wherein said viscosity reducing agent is present within in an amount between about 1 and 3% by weight of the entire composition.

7. The liquid composition of claim 4 wherein said viscosity reducing agent is propylene carbonate.

8. The liquid composition of claim 5 wherein said viscosity reducing agent is propylene carbonate.

9. The liquid composition of claim 6 wherein said viscosity reducing agent is propylene carbonate.

10. A nonaqueous liquid composition comprising at least one polymeric colorant containing composition and at least one viscosity reducing compound, wherein said viscosity reducing compound exhibits a flash point of between about −20° C. and 180° C.; wherein said at least one polymeric colorant is selected from the group consisting of any of the colorants defined within Formula (I)

$$R\{A[(B)_n R^1]_m\}_x \quad (I)$$

wherein

R is an organic chromophore;

A is a linking moiety in said chromophore selected from the group consisting of N, O, S, $SO_2N$, and $CO_2$;

B is selected from the group of one or more alkyleneoxy constituents containing from 2 to 4 carbon atoms;

n is an integer of from 2 to about 100;

m is 1 when A is O, S, or $CO_2$, and m is 2 when A is N or $SO_2N$;

x is an integer of from 1 to about 5; and

R¹ is selected from the group consisting of H, $C_1$–$C_4$ alkyl, $C_1$–$C_8$ fatty ester, a $C_1$–$C_{20}$ alkenyl succinic anhydride moiety, and any mixtures thereof; and wherein said nonaqueous liquid composition exhibits a viscosity lower than the viscosity of said at least one polymeric colorant containing composition.

11. The liquid composition of claim 10 wherein said at least one viscosity reducing compound is aprotic in nature.

12. The liquid composition of claim 10 wherein said viscosity modifying compound is present in an amount between about 0.5 and 5% by weight of the entire composition.

13. The liquid composition of claim 12 wherein said viscosity modifying compound is present within in an amount between about 1 and 3% by weight of the entire composition.

* * * * *

UNITED STATES PATENT AND TRADEMARK OFFICE
CERTIFICATE OF CORRECTION

PATENT NO. : 6,605,126 B1
DATED : August 12, 2003
INVENTOR(S) : Jusong Xia, Mark E. Ragsdale and Eric B. Stephens It is certified that error appears in the above-identified patent and that said Letters Patent is hereby corrected as shown below:

<u>Column 18,</u>
Line 2 and 6, after the word "viscosity" delete "modifying" and insert -- reducing --.

Signed and Sealed this

Twenty-first Day of September, 2004

JON W. DUDAS
*Director of the United States Patent and Trademark Office*